(12) United States Patent
Sadeck

(10) Patent No.: US 7,028,951 B1
(45) Date of Patent: Apr. 18, 2006

(54) PARACHUTE REEFING SYSTEM

(75) Inventor: James E. Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/110,277

(22) Filed: Apr. 20, 2005

(51) Int. Cl.
*B64D 17/14* (2006.01)

(52) U.S. Cl. ................... 244/152; 244/147; 244/150

(58) Field of Classification Search ........... 244/152, 244/142, 147, 150
See application file for complete search history.

(56) References Cited

U.S. PATENT DOCUMENTS

| | | | |
|---|---|---|---|
| 2,995,323 A | | 8/1961 | Dann |
| 3,278,143 A | | 10/1966 | Engel |
| 3,642,237 A | | 2/1972 | Hulteen |
| 4,065,079 A | | 12/1977 | Winchurch |
| 4,117,994 A | * | 10/1978 | Webb .................. 244/152 |
| 4,623,109 A | | 11/1986 | Sadeck |
| 4,624,427 A | | 11/1986 | Atzrott |
| 4,697,765 A | | 10/1987 | Wimmer |
| 4,863,119 A | | 9/1989 | Case |
| 4,955,563 A | | 9/1990 | Lee et al. |
| 5,205,517 A | | 4/1993 | Reuter |
| 5,209,436 A | | 5/1993 | Lee |
| 5,248,117 A | * | 9/1993 | Hennings ................ 244/152 |
| 6,328,262 B1 | | 12/2001 | Sadeck et al. |
| 6,520,453 B1 | | 2/2003 | Sadeck |
| 6,575,408 B1 | * | 6/2003 | Benney et al. ........... 244/152 |
| 6,669,146 B1 | | 12/2003 | Lee et al. |
| 6,843,451 B1 | * | 1/2005 | Fox, Jr. ................ 244/152 |
| 6,869,047 B1 | * | 3/2005 | Pouchkarev ........... 244/155 A |
| 2003/0038215 A1 | | 2/2003 | Peek |

* cited by examiner

*Primary Examiner*—J. Woodrow Eldred
(74) *Attorney, Agent, or Firm*—Vincent J. Ranucci

(57) ABSTRACT

The present invention is directed to a parachute reefing system having a flexible ring section. The flexible ring section has a circumference. The reefing system includes a plurality of equidistantly spaced loops attached to the flexible ring section and a plurality of link members wherein each link member is attached to a corresponding loop and sized to allow at least one suspension line to pass therethrough. The reefing system also has a cross-connecting section comprising pair of intersecting members that are attached to the flexible ring section. The intersecting members are attached to each other at an intersection point that is coincident with the center of flexible ring section. The reefing system has a position cord having a first end attached to the intersection point and a second end opposite the first end. A yoke is attached to the second end of the position cord and has a vertex and at least two legs that extend from the vertex. Each leg extends from the vertex to a distal end. A riser link is attached to the distal end of each leg.

13 Claims, 3 Drawing Sheets

PARACHUTE REEFING SYSTEM

STATEMENT OF GOVERNMENT INTEREST

The invention described herein may be manufactured and used by the U.S. Government for Governmental purposes without the payment of any royalties thereon.

BACKGROUND OF THE INVENTION

1. Field of the Invention

The present invention generally relates to a reefing system for parachutes.

2. Description of the Related Art

Parachutes are typically used in emergency life support situations. Parachutes also provide a means to deliver cargo and supplies to inaccessible regions and to quickly supply military troops. Materials with high strength-to weight-ratios are the standard for parachute design and construction. The performance of most parachutes with respect to deployment altitudes and velocities is limited due to the relatively small variety of materials that have the required high strength-to weight-ratios. Increasing deployment altitudes requires increases in aircraft true airspeed due to reduction in atmospheric density. This translates to faster opening of the parachute canopy and relatively higher forces placed on the entire parachute system. In order to ensure parachute system survival under these conditions, reefing techniques were developed to slow the opening of the parachute canopy to allow the parachute system to remain within its narrow performance envelope. Two commonly used reefing techniques are parachute canopy skirt reefing and parachute suspension line reefing. Canopy skirt reefing is illustrated in FIG. 1. Parachute system 10 comprises canopy 12 which has canopy skirt 14. Parachute system 10 also includes suspension lines 16 that are attached to canopy 12 and payload 18. Parachute system 10 employs a reefing cord 20 that has a predetermined circumference that translates to a diameter that is less than the full, inflated diameter of canopy skirt 14. Cord 20 is attached to canopy skirt 14 by sliding it through reefing rings permanently attached to canopy skirt 14 at each suspension line junction. Reefing cord 20 forces the parachute to inflate to a relatively small diameter so as to decelerate parachute system 10 to a lower velocity. Reefing cord 20 maintains parachute system 10 within its designed performance parameters prior to the occurrence of either the next reefing stage or total disreef. Disreefing is typically initiated by the use of expensive time-delay pyrotechnics. In the case of multi-stage reefing, multiple pyrotechnic devices are used.

Referring to FIGS. 2A and 2B, there is illustrated two suspension-line reefing techniques. Suspension line reefing techniques prevent full inflation of the parachute canopy by grouping the suspension lines together at some calculated distance below the parachute canopy skirt to first allow inflation to a particular diameter and drag area, and then allow disreefing to a larger diameter or full opening of the canopy. Line reefing can be initiated through the use of either expensive time-delay pyrotechnics or a sail slider. FIG. 2A shows parachute system 30 which employs a pyrotechnic-type line reefing technique. Parachute system 30 comprises canopy 32, suspension lines 36, and line-reefing device 38. Canopy 32 includes canopy skirt 40. Suspension lines 36 are attached to payload 42. Line-reefing device 38 is a pyrotechnic-type device that operates on a time delay. FIG. 2B shows parachute system 50 which employs a sail slider. Parachute system 50 comprises canopy 52, suspension lines 56, and sail slider 58. Sail slider 58 includes a sail portion (not shown) which is well known in the art. Canopy 52 has canopy skirt 60. Suspension lines 56 are attached to payload 62. Sail slider 58 comprises a piece of material that has an opening on its perimeter through which suspension lines 56 pass so as to allow sail slider 58 to slide up and down suspension lines 56. As the parachute is opening, the sail portion (not shown) of sail slider 58 inflates while parachute canopy 52 is inflating. The inflation of parachute canopy 52 causes parachute skirt 60 and suspension lines 56 to spread open thereby forcing sail slider 58 down suspension lines 56 toward payload 62. The inflated sail portion (not shown) of sail slider 58 creates resistance to the downward, sliding movement of sail slider 58 thereby resisting the opening of parachute canopy 52 and slowing down the parachute opening. Sail slider 58 also provides a drag surface that acts as a drogue chute to initially reduce the deployment velocity of parachute system 50. Sail slider 58 also deflects the air stream outward so as to facilitate inflation of skirt 60 of parachute canopy 52.

The prior art reveals several different parachute reefing systems. U.S. Pat. No. 2,995,323 discloses a mechanical device for controlling the reefing and dereefing of a parachute canopy. U.S. Pat. No. 3,642,237 discloses a spiral, reefed, variable drag parachute. Reefing lines are formed about the body or canopy of the parachute in a spiral configuration to control the opening shock and rate of descent of the parachute. U.S. Pat. No. 3,278,143 discloses a parachute canopy that comprises reefing located at the panel centerline of the parachute. Reefing rings are secured to a reinforcing band and the lower inside edge of the canopy at the mid-points between the adjacent connected seams of the panels. U.S. Pat. No. 4,065,079 discloses a parachute having a reefing device that secures together spaced parts of the parachute canopy in order to provide a parachute canopy that is reduced in size. The parachute includes a release device for releasing the reefed section of the canopy after initial parachute development to allow the reefed section to inflate in full deployment of the canopy. U.S. Pat. No. 4,623,109 discloses a low altitude parachute system. The parachute comprises an annular ring parachute canopy that has a control vent. A restraining device is connected to the canopy which slows the opening of the central vent while the canopy inflates during deployment of the parachute. A pilot chute is connected to the restraining device. When the pilot chute is inflated, it applies a force to the restraining device to slow the opening of the control vent. U.S. Pat. No. 4,624,427 discloses a parachute canopy reefing technique that utilizes a reefing buffer. The reefing buffer is attached to one of the parachute's suspension lines and encircles all of the suspension lines. The reefing buffer includes a pocket sewn into the buffer which holds a cutter in place. U.S. Pat. No. 4,697,765 discloses a parachute reefing/release device that uses an electro-explosive activator. U.S. Pat. No. 4,863,119 discloses a parachute reefing system that comprises an annular flexible membrane that has a centrally located vent opening and a plurality of guides spaced around the membrane. U.S. Pat. No. 4,955,563 discloses an apparatus for controlled, simultaneous opening of clustered parachutes. Each parachute in the cluster includes a canopy, a plurality of reefing rings attached to the skirt portion of the canopy and a plurality of suspension lines. U.S. Pat. No. 5,205,517 discloses a parachute system that comprises a large parachute that has an inlet control parachute. The large parachute has a main canopy which is reefed to the outer portion of the inlet control parachute. The inlet control parachute is operable to expand the inlet area of a large parachute. U.S. Pat.

No. 5,209,436 discloses a parachute that has radial reefing means for use in packing and opening the parachute canopy in a controlled manner. The parachute has a circular canopy that has a peripheral skirt and a plurality of spaced radials. Reefing rings are attached to each of selected, non-adjacent radials. Published Application No. US2003038215 discloses a cruciform parachute assembly. The parachute comprises a slider and a series of reefing rings that are fixed to the canopy crown portion. U.S. Pat. No. 6,669,146 discloses a parachute cluster assembly and a method for providing gliding and trajectory control of the parachute assembly. British Patent No. GB 776296 discloses a parachute releasing or disreefing device that comprises a member that restrains the parachute from fully opening. This member is adapted to be broken by a chemical explosive means. U.S. Pat. Nos. 6,328,262 and 6,520,453 disclose various methods for forming a parachute.

What is needed is a new and improved reefing technique that safely and effectively controls the inflation of a parachute.

SUMMARY OF THE INVENTION

The present invention is directed to a parachute reefing system comprising a flexible ring section having a circumference and a plurality of loops attached to the flexible ring section along the circumference. The loops are equidistantly spaced. The parachute reefing system further comprises a plurality of link members. Each link member is attached to a corresponding one of the plurality of loops and is sized to allow at least one suspension line to pass therethrough. The parachute reefing system further comprises a cross-connecting section comprising pair of intersecting members that are attached to the flexible ring section and intersect each other at an intersection point. The intersecting members are attached to each other at an intersection point. The intersection point is substantially coincident with the center of flexible ring section. The parachute reefing system further comprises a position cord having a first end attached to the intersection point and a second end opposite the first end. The parachute reefing system further comprises a yoke that is attached to the second end of the position cord and which comprises a vertex and at least two legs extending from the vertex. Each leg extends to a distal end. The parachute reefing system further comprises a plurality of riser links. Each riser link is attached to a distal end of a corresponding leg.

In a related aspect, the present invention is directed to a parachute reefing system that comprises a flexible ring section having a circumference, and a plurality of loops attached to the flexible ring section. The loops are equidistantly spaced along the circumference of the flexible ring section. The parachute reefing system further comprises a plurality of link members. Each link member is attached to a corresponding loop and is sized to allow at least one suspension line to pass therethrough. The parachute reefing system further comprises a cross-connecting section which comprises a pair of perpendicularly intersecting members that intersect each other at an intersection point. Each intersecting member is attached to a pair of diametrically positioned loops of the plurality of loops. The intersecting members are attached to each other at the intersection point. The parachute reefing system further comprises a position cord having a first end attached to the intersection point and a second end opposite the first end. The parachute reefing system also includes a yoke that is attached to the second end of the position cord and which comprises a vertex and a plurality of symmetrically legs extending from the vertex to respective distal ends. The second opposite end of the position cord is connected to the vertex. The parachute reefing system further includes a plurality of riser links. Each riser link is attached to a distal end of a corresponding one of the plurality of legs.

DESCRIPTION OF THE PREFERRED EMBODIMENTS

In the description of the invention various embodiments and/or individual features are disclosed. As will be apparent to the ordinarily skilled practitioner, all combinations of such embodiments and features are possible and can result in preferred executions of the invention.

Figure 1:
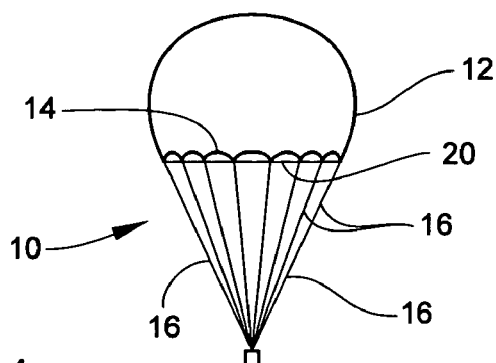
FIG. 1 is a side elevational view of a prior art parachute system.
Figure 2A:
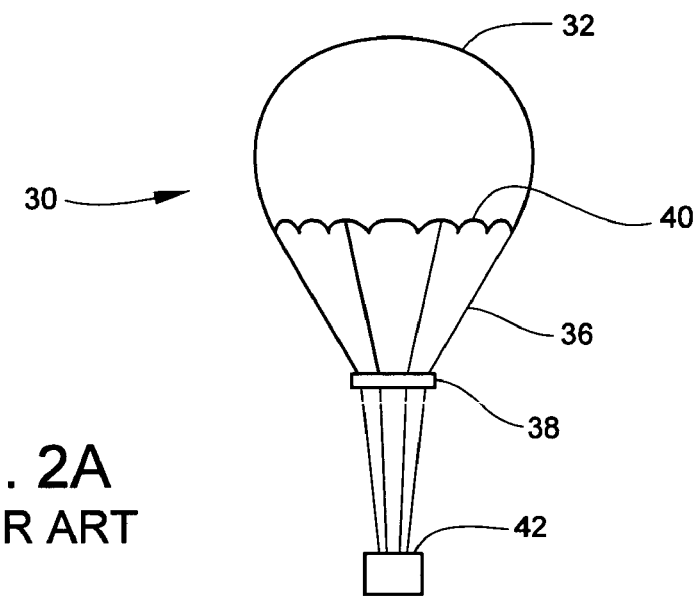
FIG. 2A is a side elevational view of another prior art parachute system.
Figure 2B:
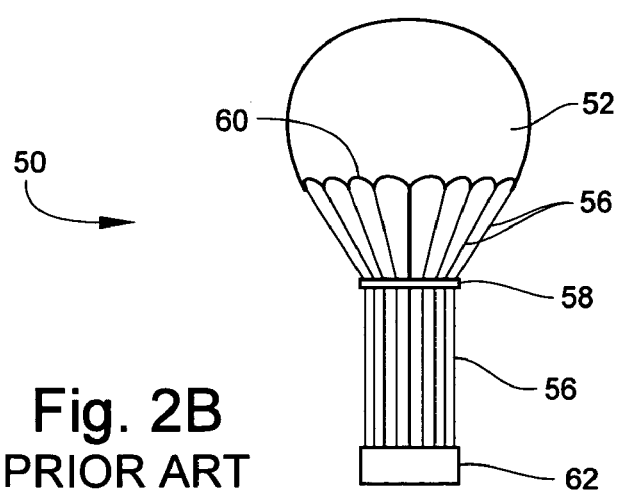
FIG. 2B is a side elevational view of a further prior art parachute system.
Figure 3:
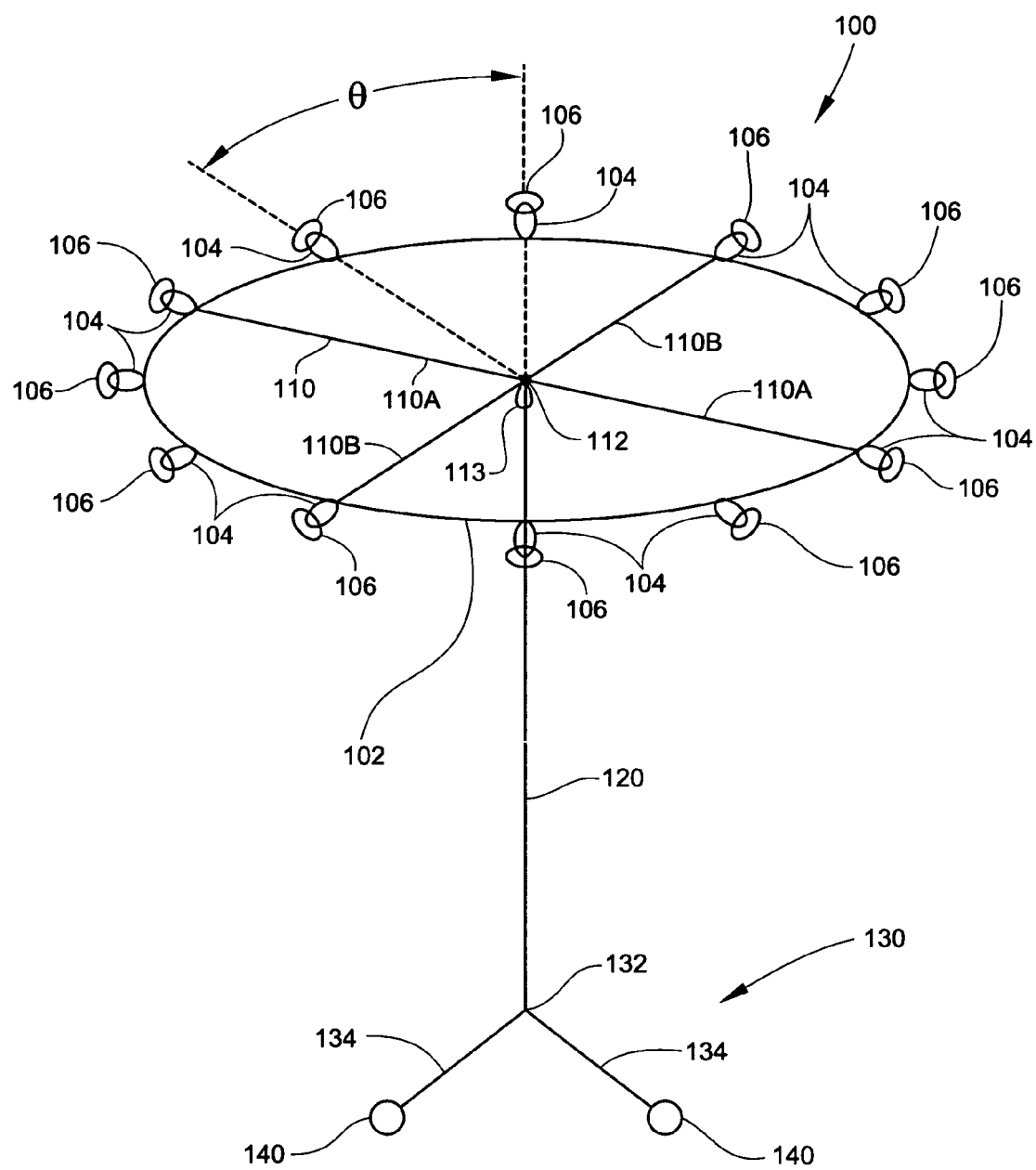
FIG. 3 is an elevational view, in perspective, of the parachute reefing system of the present invention.

Referring to FIG. 3, there is shown a diagram of reefing system 100 of the present invention. It is to be understood that reefing system 100 is used as part of a parachute system and thus, can be folded up so that it can be inserted into a parachute pack. Reefing system 100 generally comprises section 102 which has a circular shape. Section 102 is fabricated from a flexible, high-strength cord. Such high-strength cords are known in the parachute art. Reefing system 100 further includes a plurality of loops 104 tied to section 102. Loops 104 are also made from the aforesaid high-strength cord. In a preferred embodiment, loops 104 are equidistantly spaced by a predetermined angle θ. There are at least four loops 104. However, it is to be understood that there can be more than four loops and that the angular spacing can vary accordingly. For example, in one embodiment, there are twelve loops 104 that are equidistantly spaced thirty degrees apart. The size of the parachute with which reefing system 100 is to be used is a factor in determining the actual number of loops 104.

As shown in FIG. 3, reefing system 100 further includes a plurality of link members 106. A corresponding parachute suspension line, not shown in FIG. 3, passes through each link member 106. Each link member 106 is attached to a corresponding one of loops 104. Such a configuration allows section 102 and link members 106 to slide along the parachute suspension lines (not shown in FIG. 3). This feature is described in detail in the ensuing description. In one embodiment, each link member 106 is fabricated from metal, e.g. brass. In another embodiment, each link member 106 is fabricated from the aforesaid high-strength cord.

Referring to FIG. 3, reefing system 100 further comprises cross-connector 110 that is attached to and centrally positioned on section 102. Cross-connector 110 is comprised of intersecting sections 110A and 110B that intersect at intersection point 112. Intersection point 112 is substantially coincident with the center of flexible, section 102. Sections 110A and 110B are connected together at intersection point 112. In a preferred embodiment, sections 110A and 110B are knotted together at intersection point 112 in such a manner as to form loop 113. The purpose of loop 113 is discussed in the ensuing description. Section 110A is connected to a pair of diametrically positioned loops 104. Similarly, section 110B is connected to a pair of diametrically positioned loops 104. Intersection point 112 functions as a control point that controls the deployment of a parachute with which reefing system 100 is used.

Referring to FIG. 3, reefing system 100 further comprises position cord 120 that is connected to loop 113 formed at intersection point 112. Position cord 120 is fabricated from the same type of high-strength cord from which flexible ring section 102 and cross-connector 110 are made. The length of position cord 120 depends upon the overall size of the parachute with which reefing system 100 is to be used.

Reefing system 100 further comprises yoke, indicated by reference number 130, which comprises vertex 132 and at least two legs 134 that are connected to and extend from vertex 132. Each leg 134 extends to a distal end. In a preferred embodiment, vertex 132 is formed by tying a knot in single piece of cord to form a loop to which the lower end of position cord 120 and each leg 143 are connected. Reefing system 100 also comprises a plurality of riser links 140. Each riser link 140 is attached to the distal end of a corresponding leg 134. In one embodiment, each riser link 140 is made of metal. Legs 134 are made from the same high-strength cord that is used to fabricate position cord 120, cross-connector 110 and flexible ring section 102. Although two legs 134 are shown, it is to be understood that there can be more than two legs 134. In accordance with the invention, legs 134 are symmetrically arranged.

Figures 4A, 4B:
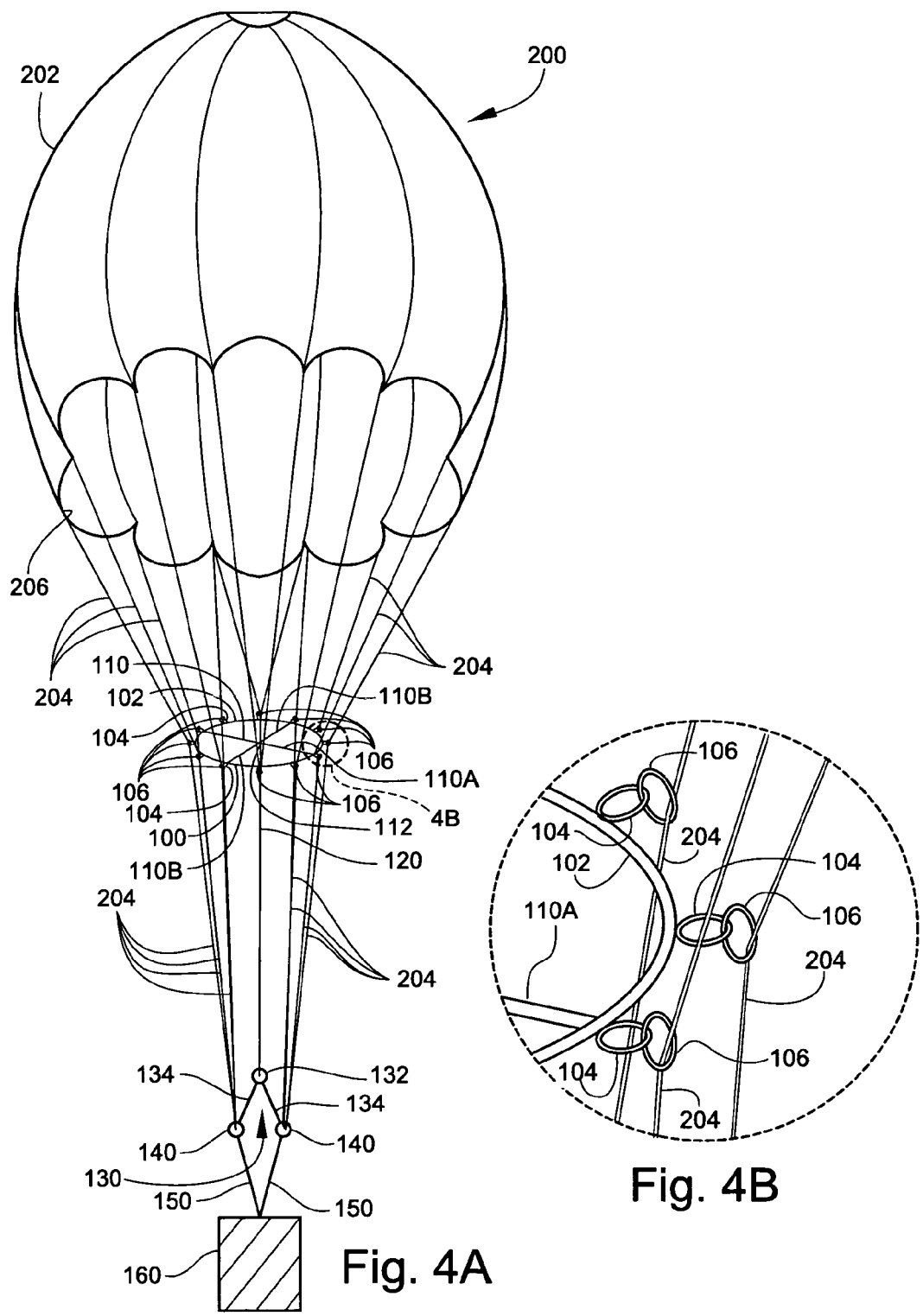
FIG. 4A is an elevational view, in perspective, of a parachute system that utilizes the parachute reefing system of FIG. 3.
FIG. 4B is a fragmentary view of the view of FIG. 4B.

Referring to FIGS. 4A and 4B, there is shown parachute system 200 which comprises reefing system 100, canopy 202 and suspension lines 204. Canopy 202 includes canopy mouth 206. Reefing system 100 controls the rate at which canopy mouth 206 opens during descent of parachute system 200. Suspension lines 204 pass through link members 106 that are attached to flexible ring section 102 of reefing system 100 and are attached to riser links 140. The distal end of each leg 134 is attached to a corresponding riser link 140. Cords or cables 150 are attached between and to riser links 140 and payload 160.

OPERATION

Once parachute system 200 has deployed, parachute canopy 202 begins to inflate. Canopy mouth 206 of parachute canopy 202 is prevented from opening completely due to the diameter restriction imposed by section 102. Section 102 is positioned at a specific location along the length of suspension lines 204. This specific location may be different for parachute canopies of different design and shape. Section 102 is maintained in its specific location by position cord 120, which positions section 102 at some distance from canopy mouth 206. During the initial inflation of parachute canopy 202, canopy mouth 206 attempts to open but is prevented from doing so due to friction between suspension lines 204 and link members 106 that are positioned along the circumference of flexible ring section 102. As canopy 202 inflates, the pressure in canopy 202 increases there by causing the radial spreading forces at canopy mouth 206 to increase and overcome friction between suspension lines 204 and link members 106. As a result, section 102 slides down suspension lines 204 toward payload 160. As the parachute canopy 202 increases its drag area, the velocity of parachute system 200, with payload 160 attached thereto, is reduced thereby lowering the parachute opening forces and allowing the parachute to remain within its performance envelope. Thus, reefing system 100 increases the time required for parachute canopy 202 to completely open thereby slowing down the opening process. Reefing system 100 continues to slow down the opening of canopy 202 until section 102 reaches riser links 140 and position cord 120 rests upon payload 160. Once canopy 202 is fully opened, the parachute system 200 is no longer decelerating and begins a steady state descent at some terminal velocity.

It is to be understood that the term "connected", as used in the foregoing description with respect to the high-strength cord used to fabricate portions of reefing system 100, includes knotting and/or tying techniques known in the parachute art.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations, changes and modifications may be made by those skilled in the art without departing from the spirit of the invention. Accordingly, the foregoing detailed description should be considered exemplary in nature and not as limiting the scope and spirit of the invention as set forth in the attached claims.

What is claimed is:

1. A parachute reefing system comprising:
   a flexible ring section having a circumference;
   a plurality of equidistantly spaced loops attached to said flexible ring section;
   a plurality of link members, each link member being attached to a corresponding loop and sized to allow at least one suspension line to pass therethrough;
   a cross-connecting section comprising pair of intersecting members that are attached to said flexible ring section, said intersecting members being attached to each other at an intersection point that is substantially coincident with the center of said flexible ring section;
   a position cord having a first end attached to said intersection point and a second end opposite said first end;
   a yoke attached to said second end of said position cord and comprising a vertex and at least two legs extending from said vertex to respective distal ends; and
   a plurality of riser links, each riser link being attached to a distal end of a corresponding leg.

2. The reefing system according to claim 1 wherein said intersecting members perpendicularly intersect each other.

3. The reefing system according to claim 1 wherein each intersecting member is attached to a diametrically positioned pair of said plurality of loops.

4. The reefing system according to claim 1 wherein said legs are symmetrically arranged.

5. The reefing system according claim 1 wherein said flexible ring section is fabricated from high-strength cord.

6. The reefing system according to claim 1 wherein said cross-connecting section is fabricated from high-strength cord.

7. The reefing system according to claim 1 wherein each loop is fabricated from high-strength cord.

8. The reefing system according to claim 1 wherein said position cord is fabricated from high-strength cord.

9. The reefing system according to claim 1 wherein said yoke is fabricated from high-strength cord.

10. The reefing system according to claim 1 wherein each link member is fabricated from high-strength cord.

11. The reefing system according to claim 1 wherein each link member is fabricated from metal.

12. The reefing system according to claim 1 wherein each riser link member is fabricated from metal.

13. A parachute reefing system comprising:
- a flexible ring section having a circumference;
- a plurality of loops attached to said flexible ring and equidistantly spaced apart;
- a plurality of link members, each link member being attached to a corresponding one of said plurality of loops and sized to allow at least one suspension line to pass therethrough;
- a cross-connecting section comprising pair of perpendicularly intersecting members that intersect each other an intersection point which is substantially coincident with the center of said flexible ring section, each intersecting member being attached to a pair of diametrically positioned loops of said plurality of loops, said intersecting members being attached to each other at the intersection point;
- a position cord having a first end attached to said intersection point and a second end opposite said first end;
- a yoke attached to said second end of said position cord and comprising a vertex and a plurality of symmetrically arranged legs extending from said vertex to respective distal ends; and
- a plurality of riser links, each riser link being attached to a distal end of a corresponding leg.

* * * * *